United States Patent
Kiest, Jr.

(10) Patent No.: US 9,261,221 B2
(45) Date of Patent: *Feb. 16, 2016

(54) PIPE LINER HAVING A WIRELESS DATA TRANSMITTER WITH SENSING CAPABILITIES

(71) Applicant: LMK Technologies LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,912

(22) Filed: Aug. 22, 2014

(65) Prior Publication Data

US 2014/0360611 A1 Dec. 11, 2014

Related U.S. Application Data

(63) Continuation of application No. 13/561,797, filed on Jul. 30, 2012, now Pat. No. 8,844,577.

(51) Int. Cl.
| | |
|---|---|
| *F16L 55/162* | (2006.01) |
| *F16L 55/18* | (2006.01) |
| *F16L 55/165* | (2006.01) |
| *F16L 55/179* | (2006.01) |
| *F16L 9/14* | (2006.01) |
| *E03F 3/06* | (2006.01) |

(52) U.S. Cl.
CPC . *F16L 55/18* (2013.01); *F16L 9/14* (2013.01); *F16L 55/1651* (2013.01); *F16L 55/1653* (2013.01); *F16L 55/179* (2013.01); *E03F 2003/065* (2013.01)

(58) Field of Classification Search
CPC ..... F16L 55/1653; F16L 55/179; G01D 5/48; G01K 5/483
USPC ........................ 138/98, 97, 104; 156/64, 378; 405/184.2
See application file for complete search history.

(56) References Cited

U.S. PATENT DOCUMENTS

| | | |
|---|---|---|
| 4,995,761 A | 2/1991 | Barton |
| 6,019,136 A | 2/2000 | Walsh |

(Continued)

OTHER PUBLICATIONS

LMK Technologies, LLC, PCT/US2013/050798 filed Jul. 17, 2013, "Notification of Transmittal of the International Search Report and the Written Opinion of the International Searching Authority, or the Declaration", mailed Nov. 4, 2013.

*Primary Examiner* — Patrick F Brinson
(74) *Attorney, Agent, or Firm* — Nyemaster Goode, P.C.

(57) ABSTRACT

The present invention provides a liner assembly for repairing the wall of a pipe that includes a transmitter or transmitters capable of transmitting information, such as identification information and physical characteristics of the area around the transmitter. Embedded in the liner is a transmitter, which includes a radio-frequency identification and at least one sensor. The RFID transmits identification information about the repaired wall, while the sensor provides physical characteristics of the environment in and around the pipe. Examples of physical characteristics may include temperature, pressure, flow, chemical reactions, velocity of the pipe, and the like. Additional transmitters may be used along the length of the pipe to determine characteristics at multiple locations, with each additional transmitter including the same or different sensors.

19 Claims, 4 Drawing Sheets

(56) References Cited

U.S. PATENT DOCUMENTS

| | | |
|---|---|---|
| 6,276,398 B1 | 8/2001 | Lange |
| 6,806,808 B1 | 10/2004 | Watters |
| 6,942,426 B1 | 9/2005 | Kampbell |
| 7,598,858 B2 | 10/2009 | Quist |
| 7,720,570 B2 | 5/2010 | Close |
| 7,777,628 B2 | 8/2010 | Tilson |
| 7,836,760 B2 | 11/2010 | Saylor |
| 2008/0173109 A1 | 7/2008 | Cogen |
| 2009/0092173 A1 | 4/2009 | Glombitza |
| 2011/0030875 A1 | 2/2011 | Conte |
| 2011/0186203 A1 | 8/2011 | Lindner |
| 2012/0007714 A1 | 1/2012 | Muhlin |

PIPE LINER HAVING A WIRELESS DATA TRANSMITTER WITH SENSING CAPABILITIES

CROSS-REFERENCE TO RELATED APPLICATIONS

This application is a Continuation Application of U.S. Ser. No. 13/561,797, filed Jul. 30, 2012, which is herein incorporated by reference in its entirety.

FIELD OF THE INVENTION

The present invention relates generally to the repair and monitoring of pipes and underground structures. More particularly, but not exclusively, the invention relates to a liner assembly for repairing the wall of a pipe that includes a transmitter or transmitters capable of transmitting information, such as identification information and physical characteristics of the area around the transmitter.

BACKGROUND OF THE INVENTION

Prior methods for repairing damaged portions of pipelines include moving a liner tube impregnated with a liquid material capable of curing and hardening to a position within the pipe where the damaged portion is located. The liner tube is installed by pulling, pushing, or everting the liner into the host pipe. Once the liner is positioned within the host pipe, it is pressurized, usually by an inflation bladder, causing the liner to press against the interior wall of the host pipe, and the liner is cured by applying heat, such as steam or hot water. These liners can also be cured at ambient temperatures by chemical mixtures that generate an exothermic reaction, the use of ultraviolet light or other photocuring initiators, or by electron beam curing. The liner tube forms an interior liner in the pipe for the pipeline being repaired. One such process is known as cured-in-place pipelining.

In most pipelines, lateral or branch pipes are connected to main pipes. In sewer systems, the connection of a lateral pipe to a main sewer pipe is accomplished by forming a hole in the main line with a hammer. The lateral pipe is then simply abutted against the hole, and then the juncture is covered with mortar, dirt, or the like. Damage or leaking can occur at the juncture between the lateral pipe and the main pipe, which is generally known as one of the weakest points in a collection sewer system. T-shaped or Y-shaped liner tubes have been utilized to fit within the junction between the lateral and main pipes. Liner tubes form a T-shaped or Y-shaped liner after hardening to the interior of the junction between the pipes. Again, inflation bladders are typically used to pressurize the liners against the interior walls of the host pipes.

The liner tubes are often impregnated with a resinous material, which cures and hardens with the addition of either heat or an independent exothermic reaction. At the main and lateral junction, however, the damaged areas often allow the leakage of water. The junction is located at the lowest spot underground of the lateral pipe. Therefore, it is only natural for the water to flow to the area around the junction of the main and lateral pipe. Water tends to seep through the fractures and joints of the junction, and will interact with the resin impregnated liner, and in turn, the liner may not be able to cure to fully repair the junction.

The repair of the pipes and pipe junctions is therefore a necessity. The repairs are oftentimes performed in a large scale, such as for an entire neighborhood or even city. The number of assemblies used to repair the pipes is great. However, as the lateral pipes extend to specific buildings or addresses, it may become difficult to track when the pipe was repaired, and whether there were any special circumstances (increased resin, obstructions, special environment conditions, etc.) in repairing the pipe. Labels can be added to the repaired walls designating the repair, but these labels will fade over time, or may even be detached from the wall.

In addition, many resins used to repair the pipes require heat or some other accelerant to decrease the curing time for the resins. Steam or hot water is oftentimes used to expand the bladder, which in terms creates the exothermic reaction to aid in curing the resin to repair the pipe wall. However, the temperature required for the exothermic reaction is vital, and it is necessary to maintain the temperature for the entire curing period. It is advantageous to be able to continuously measure the temperature within the pipe so that adjustments can be made, if necessary, to make sure that the temperature maintains within the range needed to cure the resin.

Other measurements and data may also be useful. For example, as the bladder exerts a pressure during the expansion of the liner, the amount of pressure within the liner assembly can be used to determine if the proper amount of pressure is being applied. Furthermore, once the pipe has been repaired, it may be advantageous to ensure that there are no obstructions, and that the flow through the pipe has been fully restored. Alternatively, it may be advantageous to measure pipe deflection or the load(s) bearing on a pipe at a given time to assess the structural integrity of the pipe.

Accordingly, there is a need in the art for an improved lining method and apparatus that overcomes the problems resulting from not being able to determine identification properties of a lined pipe. There is also a need in the art for an improved means and method for lining a pipe that allows a repair crew to be able to continuously and easily determine physical characteristics within the pipe.

SUMMARY OF THE INVENTION

It is therefore a primary object, feature, and/or advantage of the present invention to provide an improved apparatus and method that overcomes the deficiencies in the art.

It is another object, feature, and/or advantage of the present invention to provide an improved method of lining a pipe that provides for identification properties of the lined pipe.

It is yet another object, feature, and/or advantage of the present invention to provide an improved method and apparatus for lining a pipe including a liner having a transmitter embedded therein.

It is still another object, feature, and/or advantage of the present invention to provide an improved method and apparatus for lining a pipe that provides for the monitoring of physical characteristics within the pipe.

It is still a further object, feature, and/or advantage of the present invention to provide an improved method and apparatus for lining a pipe that provides wireless monitoring of pipe repair.

It is still a further object, feature, and/or advantage of the present invention to provide an improved method and apparatus for lining a pipe that provides a field-programmable wireless data transfer mechanism that includes information specific to the pipe liner and repair.

It is yet a further object, feature, and/or advantage of the present invention to provide an improved method and apparatus for repairing a pipe that provides continuous data of the environment within and around the pipe.

These and/or other objects, features, and advantages of the present invention will be apparent to those skilled in the art.

The present invention is not to be limited to or by these objects, features and advantages. No single embodiment need provide each and every object, feature, or advantage.

According to one aspect of the present invention, a method of repairing a pipe is provided. The method includes the step of providing a liner assembly comprising a liner impregnated with a material capable of curing and hardening, and including a transmitter capable of transmitting both identification and at least one physical characteristic. The liner assembly is then positioned within the pipe. The liner is pressed against the pipe, and the identification and physical characteristic transmitted by the transmitter are received as the material cures and hardens.

According to another aspect of the present invention, a liner assembly for repairing a pipe is provided. The assembly includes a liner. A transmitter is connected to the liner that is capable of transmitting both an identification and at least one physical characteristic.

According to yet another aspect of the present invention, kit for repairing a pipe is provided. The kit includes a liner and a transmitter capable of transmitting both an identification and at least one physical characteristic.

DETAILED DESCRIPTION OF THE PREFERRED EMBODIMENTS

Figure 1:
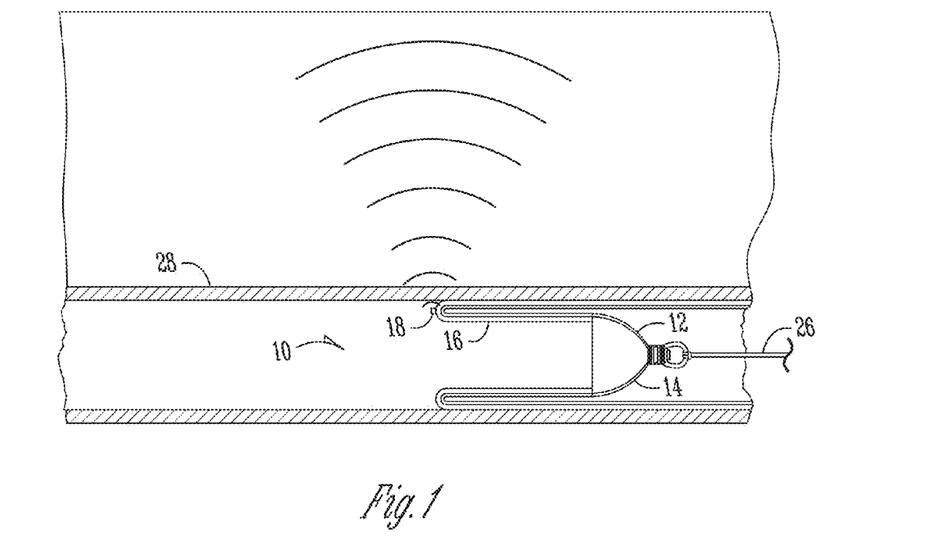
FIG. 1 is a sectional view of a pipe being lined with a liner assembly of the present invention.
Figure 2:
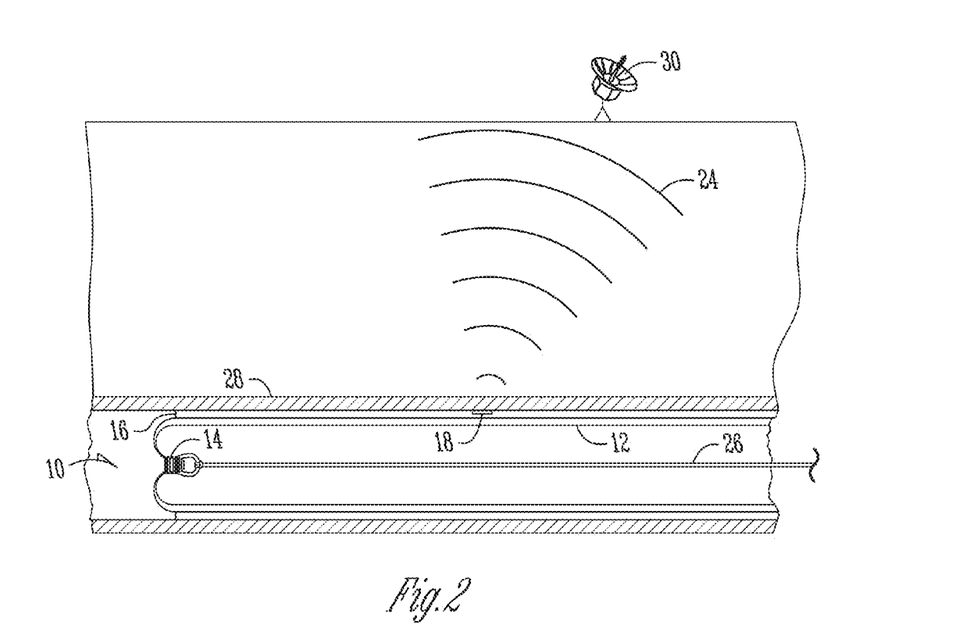
FIG. 2 is a sectional view of the pipe of FIG. 1 with the liner curing.

FIGS. 1 and 2 show the repair of a pipe, and in particular, a straight pipe. The pipe 28 may be any sort of pipe, such as a sewer pipe or the like. Furthermore, it should be appreciated that the present invention contemplates that the invention be used in many types of pipes, including but not limited to gravity pipes, pressure pipes, water pipes, and oil/gas pipes. The pipe 28 of FIG. 1 is shown being repaired by a liner assembly 10. The liner assembly 10 includes a bladder 12 and a liner 16. The bladder 12 is an expandable-type bladder, as is known in the art. The bladder 12 includes a closed end 14 that is inverted within the bladder 12 body. The liner 16 is also inverted into the bladder body, with the liner 16 generally surrounding the bladder 12 once the liner has been everted, as is shown in FIG. 2.

The liner 16 comprises a resin absorbent material, such as felt or the like. The liner 16 is also impregnated with a resinous material that is capable of curing and hardening within the pipe 28. Therefore, when the liner 16 is pressed against the interior wall of the pipe 28, the cured liner will form the new interior wall of the pipe 28. The liner assembly 10 of FIGS. 1 and 2 is shown to be a cured-in-place liner that is everted as a fluid expands the assembly. When going from FIG. 1 to FIG. 2, air or another fluid is added to the bladder 12, which causes the bladder 12 to expand, pressing the liner 16 against the wall of the pipe 28. The increased pressure within the bladder 12 due to the fluid also causes the closed end 14 of the bladder 12 to evert along the length of the pipe 28. As the liner assembly 10 is everted into the pipe 28, the portion of the liner 16 that is within the bladder 12 body will evert to come in contact with the pipe wall, and the bladder 12 will continue to provide pressure to press the liner 16 against the wall.

In addition to the pressure from the bladder 12 on the liner 16, heat or another factor may be changed within the bladder 12 to speed up the curing of the material that has been impregnated into the liner 16. It should be appreciated that many resins, grouts, and other materials used to repair the wall of pipes require an exothermic reaction for the material to cure. Therefore, steam may be used to inflate the bladder 12.

As shown in FIGS. 1 and 2, as the liner assembly 10 is being everted into the pipe 28, a transmitter 18, which is positioned with the liner 16, will be included at the repaired pipe wall. The transmitter 18 includes a wireless identification tag, in this case a radio frequency identification tag (RFID tag 20), and a sensor 22 for determining a characteristic within the pipe 28. For example, a sensor may be a thermometer or other temperature-detecting sensor to determine the temperature within the pipe. As noted above, as many materials require an exothermic reaction, it is important to know what the temperature is within the pipe 28 to ensure that the proper temperature has been reached such that the material fully cures within the pipe 28. The RFID tag 20 will provide identification for the pipe, such as the date and time of repair, the address of the location of the pipe, or other identifying features of the pipe repair. Thus, the RFID tag 20 of the transmitter 18 can be used to provide information related to the repair of the pipe. The sensor 22 of the transmitter 18 can to be used to ensure that the pipe 28 is fully repaired, while also determining physical characteristics within the pipe during repair and after the pipe 28 has been repaired, such as the flow through the pipe 28.

Once the liner assembly 10 has been everted through the pipe, as shown in FIG. 2, the bladder 12 can be removed from within the repaired pipe 28. A line 26 may be attached to the closed end 14 of the bladder 12 such that the line is pulled from a location downward in the pipe 28 to peel the bladder 12 from the cured liner 16. Thus, the bladder 12 may have a frangible connection to the liner 16 such that the bladder 12 is easily detached from the liner 16 and peeled away inwardly until the bladder 12 is fully removed from the liner 16. Alternatively, the material for the bladder 12 may be compatible for adhesion to the liner 16, and remain within the pipe 28 to act as a smooth interior surface after curing.

The transmitter 18 will remain within the pipe, as is shown in FIG. 2. While FIG. 2 shows the transmitter 18 positioned between the liner 16 and the pipe wall 28, it should be appreciated that the transmitter 18 may be positioned anywhere along with the liner 16. For example, the transmitter 18 may be positioned on the inside of the liner 16 or may be positioned between two layers of the liner 16 such that it is protected on both sides.

Alternatively, a portion of the transmitter 18 may be attached to the liner 16 such that a sensing element may access the interior of the pipe after installation. As such, a portion of the transmitter 18 having the sensing element may extend into the interior of the pipe 28. Another configuration includes where the transmitter 18 lies beneath a portion of the cured liner, such as a clear polymeric film, to allow the sensing element to obtain a reading within the pipe 28. Such configurations are advantageous when a sensor 22 is used to measure a physical characteristic within the pipe 28 after installation of the liner 16, such as pipe flow.

Also shown in FIG. 2 is a signal 24 being emitted by the transmitter 18. The embodiment shown in FIG. 2 shows an active transmitter 18 that transmits a signal 24 outwardly from the transmitter 18. A receiver 30 picks up the signal 24. The receiver 30 of FIG. 2 is shown at a location outside of the pipe 28 and above the ground. Therefore, a receiver 30 may be moved over the ground until it picks up a signal from a transmitter 18. The receiver 30 can then interpret the information contained in the signal 24 to determine the identification characteristics and physical characteristics emitted by the transmitter 18.

Figure 3:
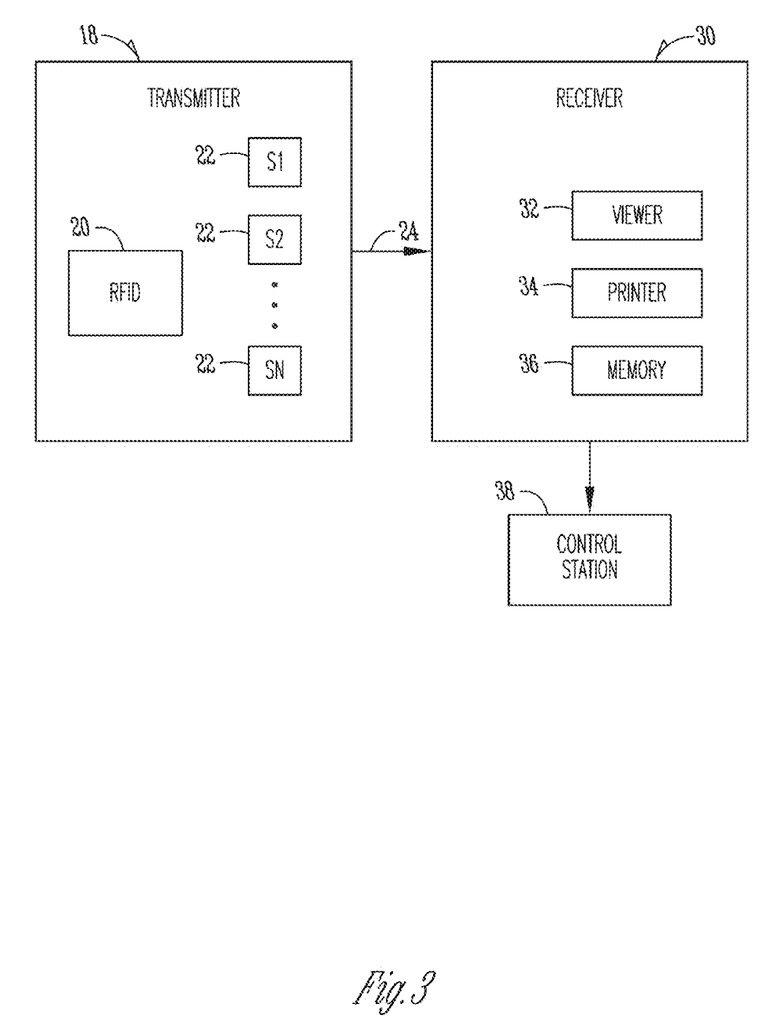
FIG. 3 is a block diagram of a transmitter system used with the present invention.

FIG. 3 is a block diagram showing a configuration of the transmitter 18 and receiver 30. As mentioned above, the transmitter 18 includes an RFID tag 20 and at least one sensor 22 for determining physical characteristics within the pipe 28. The sensor 22 could be a pressure sensor, a sensor for measuring distance, a load cell, a temperature sensor, a strain gauge, an accelerometer, a flow meter, a chemical sensor, or the like. Furthermore, as is shown in FIG. 3, the transmitter 18 may include a plurality of sensors 22 or a sensor array. Thus, the transmitter 18 could include the RFID tag 20 along with any number of sensors 22 as may be desired for the particular pipe repair and other characteristics. For example, some pipe repairs occur in areas where the pipe crosses beneath a road, mountain, river or other body of water, field, or some combination thereof. The physical characteristics of the pipe will be different under each different land condition. Therefore, a transmitter 18 may be customized such that different physical characteristics may be determined at approximately the locations under the body of water or the road or any other land condition. Under such conditions, the transmitter 18 and sensors 22 may be configured to measure pipe deflection or the load(s) bearing on a pipe at a given time to assess the structural integrity of the pipe.

As mentioned above, the RFID tags or transmitters may be passive or active. Furthermore, the transmitter 18 could operate on radio frequencies or other wireless data transfer systems (as non-limiting examples, hypersonic or infrared systems). When a passive RFID tag 20 is used, a power source, shown as receiver 30, must be inserted into the pipe 28 to read the information. This is because passive RFID tags operate by using the radio energy transmitted by the receiver as its energy source or to activate an onboard battery. However, when aggressive or active RFID tags 20 are used, a receiver 30 could be positioned further away from the transmitter 18, potentially even above ground. This is the example shown in FIG. 2, and is due to the fact that aggressive transmitters constantly emit a signal or transmission, whether weak or strong, and this signal is read by a receiver. Alternatively, the transmitter 18 may need no power at all, or may be self powered by the medium in which it is placed (as a non-limiting example, flowing water).

The RFID tag or other wireless data transfer system may be capable of data entry in the field or may be otherwise field-programmable. Such a feature may be included with the transmitter 18 by configuring an interface for a physical link (such as a port for a cable) directly to memory within the RFID tag 20 for data entry or by including a programmable device, such as an integrated circuit or a field-programmable gate array, within the transmitter 18. Transmitter 18 may further include a receiver configured for wireless data entry and programming (not shown). It should also be noted that the inclusion of a field-programmable gate array will also allow for reprogramming of a single sensor to run several different tests. These features will provide several advantages in pipe lining applications. A first advantage includes the flexibility of allowing an installation crew to enter the date and time of pipe repair, the name of construction team who repaired the pipe, the address and/or location of the main and lateral pipes, and the like. Secondly, because a variety of conditions exists in the field, operators may wish to include a summary of the obstacles encountered during installation with the RFID tag. For example, a lateral pipe may include a backflow preventer. It is difficult to determine if such a backflow preventer is installed prior to lining, so upon discovery, the field crew may enter a note on the RFID tag indicating the presence of a backflow preventer. Such information will certainly be useful for successfully completing subsequent repair work. A third advantage is that the ability to enter data or program the device in the field decreases the manufacturing cost associated with the RFID tag.

The receiver 30 is a device or application having the capability of receiving the information transmitted via wireless communication or telemetry by the transmitter 18. For RFID tags 20, an RFID reader may be a one-way radio receiver that reads the data being transmitted by the RFID transmitter, as is shown in FIG. 2. Alternatively, an RFID reader may be considered an interrogator. An interrogator is a two-way radio transmitter-receiver that sends a signal to the RFID transmitter and reads the response.

The receivers 30 may transmit the collected data to a computer system running RFID software or RFID middleware. This is shown in FIG. 3. The receiver may include the computer system or also may send it via a line or wirelessly to a computer system. The computer system may include a viewer, such as a monitor. The monitor may include information such as the temperature within the pipe 28, the pressure or force on the liner 16, or other information transmitted by the transmitter 18. The information may be displayed on the monitor or viewer 32 in any number of ways. For example, the monitor 32 may include a graph with the temperature along the Y-axis and a time along the X-axis such that the graph can show any change in temperature and to ensure that temperature range maintains within the range needed for the material impregnated in the pipe 28 to cure and harden. Thus, any dip or spike in temperature can be observed via a control station 38, and an operator may have the opportunity to adjust the temperature within the pipe 28. The other sensors may also include graphs or other monitoring characteristics. The receiver may also include a printer 34 and a memory source 36. The printer 34 can be used to print out the graph or physical characteristics as they are being determined such that an operator can take the printed material to study it at a later time. The printed material may be useful to build up a catalog of conditions. For example, if it is known that the operator is repairing a pipe under a certain condition, such as a body of water, the operator can take the printed material received from the sensors 22 in the liner 16 to track the conditions under the body of water. Therefore, the next time a pipe is to be repaired under a body of water, the operator will already have the information cataloged to have an idea of what the conditions may be like, and thus, the operator can plan accordingly.

Additionally, the receiver 30 may include a source of memory 36, which may be permanent or removable from the receiver 30. The memory 36 will work similar to the printed material 34. Thus, an operator can take the saved information from the transmitter 18, including the identification from the RFID tag 20, and the physical characteristics determined by the sensors 22, and save that information to evaluate later or to create a database. As with the printed material, the database could be used to aid any future repairs with similar physical characteristics.

FIG. 3 also shows a control station 38 operatively connected to the receiver 30 and transmitter 18. The control station 38 can include controls, such as controls for expanding the bladder 12 and everting the liner assembly 10 within the pipe 28. Thus, the control station 38 may include controls for air or other fluid pressure, temperature, etc. Once the control station 38 has received information from the transmitter 18 and receiver 30, the control station 38 can be configured to automatically adjust one or more of the controls accordingly. For example, if the temperature within the pipe 28 has dropped below a curing temperature of the material used to cure and harden, the control station 38 can activate a heating element or other means to increase the temperature within the bladder 12 and/or liner 16. Once the temperature has risen to a proper range for curing, the control station 38 receives a command from the receiver 30 to stop increasing the heat within the pipe 28. Other controls of the control station 38 may include controlling the pressure within the bladder 12 to speed up or slow down the eversion rate of the liner assembly 10, as well as to press the liner 16 against the wall of the pipe 28.

Figure 4:
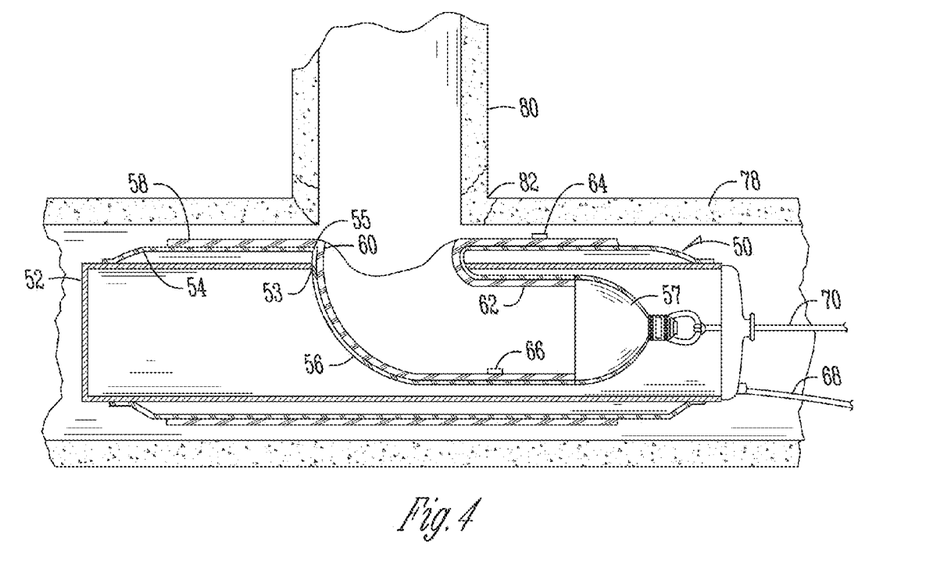
FIG. 4 is a sectional view of a junction of a main and lateral pipe being lined by the present invention.
Figure 5:
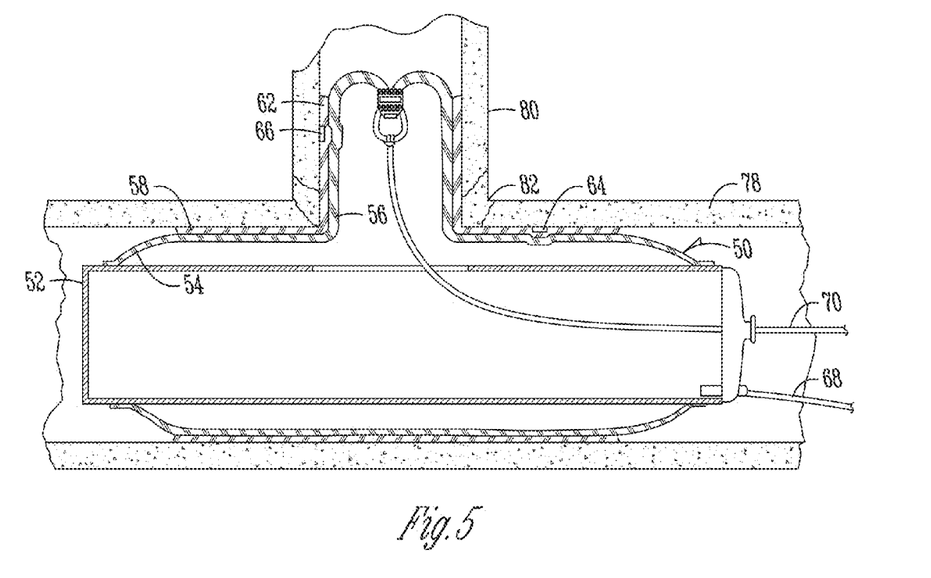
FIG. 5 is a sectional view of the junction of FIG. 4 with the liner pressed against the pipe walls.
Figure 6:
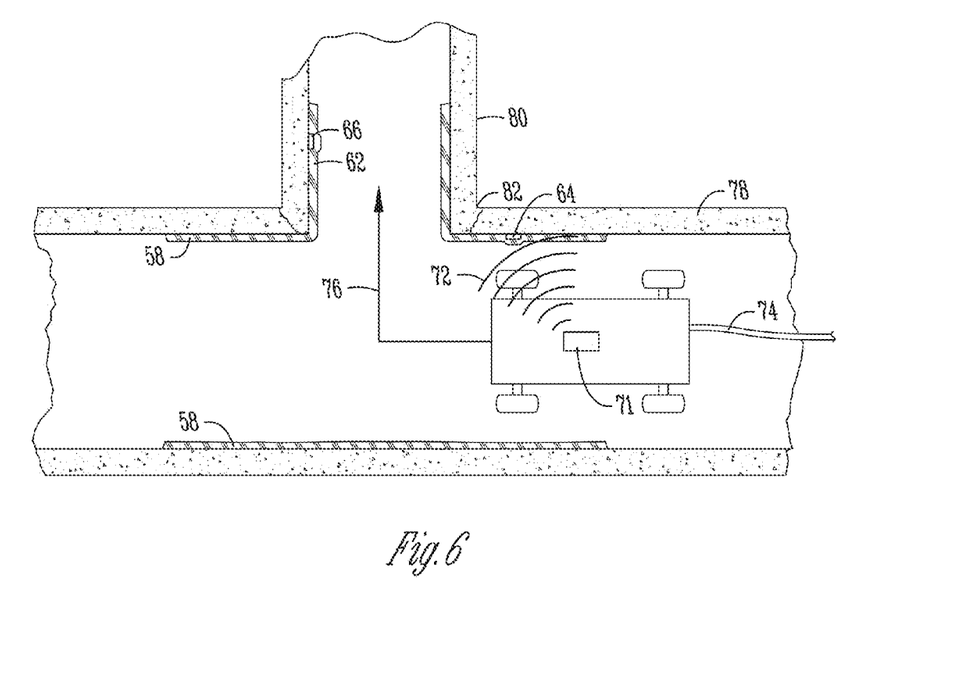
FIG. 6 is a sectional view of the junction of FIG. 4 after the pipe walls have been repaired.

FIGS. 4-6 show another embodiment of the present invention. FIG. 4 shows a junction 82 of a main pipe 78 and a lateral pipe 80 extending from the main pipe 78. The lateral pipe 80 may be a cleanout pipe or a lateral pipe that extends from as specific address, such as a home to a main sewer pipe 78. Furthermore, the lateral pipe 80 may extend from the main pipe 78 in a wye or tee shape. Many times the juncture 82 between the main and lateral pipes 78, 80 becomes weak and damaged, thus requiring repair. Therefore, the liner assembly 50 of FIG. 4 shows one embodiment for repairing the juncture of the main and lateral pipes 78, 80.

The liner assembly 50 is an inversion-type liner assembly including a launcher device 52. The launcher device 52 includes ends and an opening 53 in the launcher device body. The liner assembly 50 also includes a main bladder tube 54 and a lateral bladder tube 56 extending from an opening 55 of the main bladder. The lateral bladder tube 56 includes a closed end 57 and is inverted to within the launcher device 52. Furthermore, the closed end 57 of the lateral bladder tube 56 is connected to a line 70. At least partially surrounding the main bladder tube 54 and the launcher device 52 is a main liner member 58. The main liner member 58 may be a top hat type member with a collar, or it may be a tube, which surrounds the main bladder tube 54. The main liner member 58 includes a main liner member opening 60, with a lateral liner tube 62 extending from the opening 60. Likewise, the lateral liner 62 is positioned within the lateral bladder tube 56 and inverted to within the launcher device 52. Once the bladders and liners have been positioned around and within the launcher device 52, the launcher device 52 is positioned within the main pipe 78 with the launcher device opening 53 adjacent the lateral pipe 80. Air or another fluid is inserted through a hose 68 into the launcher device 52 to expand the main and lateral bladders 54, 56.

Once the air or other fluid has continuously been added to the liner assembly 50, the lateral bladder and liner 56, 62 become everted through the launcher device opening 53 and begin to extend within the lateral pipe 80 to a position with the lateral liner 62 positioned between the lateral bladder 56 and the lateral pipe wall. This is shown in FIG. 5. At the same time, the main bladder tube 54 has expanded to press the main liner member 58 against the walls of the main pipe 70. As shown in FIGS. 4 and 5, first and second transmitters 64, 66 have also been added to the liner assembly 50. The first and second transmitters 64, 66 include an RFID tag 20 and at least one sensor 22 for determining the physical characteristics within the main and lateral pipes 78, 80. The transmitters 64, 66 are positioned at the main and lateral lines 58, 62. While FIGS. 4-6 show the use of two transmitters, it should be appreciated that any number of transmitters may be used with the liner assembly 50. Furthermore, only one transmitter may be used with the liner assembly 50 as well.

The transmitters 64, 66 provide information for within the pipes 78, 80. For example, the transmitters 64, 66 include RFID tags 20 that include identification for the repair process of the pipes 78, 80. The RFID tags 20 may be field-programmable and include such information as date and time of repairing the junction 82, name of construction or contracting team who repaired the junction 82, type of materials used to repair the junction 82, and the address and/or location of the main and lateral pipes 78, 80. This information may be useful for someone to determine if more work needs to be done at a future date. Furthermore, the sensor or sensors 22 of the transmitters 64, 66 will provide physical characteristic information from within the pipes 78, 80 during repair and after repair. During repair, the transmitters 64, 66 may include sensors 22 such as temperature sensors and pressure sensors. The temperature and pressure sensors will provide information to the repair operators to ensure that the liners, which have been impregnated with a material capable of curing and hardening, are fully cured and hardened at the correct temperature and pressure. Furthermore, the sensors may include time-based sensors to indicate the length of time that the curing process has undergone. Once the bladders have been removed, the transmitters 64, 66 may include sensors 22 such as flow meters that determine the amount of flow through the pipe. When such a flow meter is used, a portion of the transmitters 64, 66 may be attached to the liner 58, 62 such that a portion of the transmitter including the flow meter is able to access the pipe interior after installation. The flow meters will provide information to allow someone outside of the pipes 78, 80 to ensure that there is no obstruction within the pipes 78, 80 from the repair process.

FIG. 6 shows the main and lateral pipes 78, 80 after the resinous material impregnated into the main and lateral liners 58, 62 has cured and hardened within the pipes. Once they are cured and hardened, the main and lateral bladders are deflated and removed along with the launcher device 52. However, as the transmitters 64, 66 have been placed between the liners 58, 62 and pipe walls, the transmitters 64, 66 will remain in the pipe after it has been repaired. Furthermore, FIG. 6 shows an embodiment of a passive type RFID transmitter and sensor. The passive transmitter will not emit any sort of signal, and a receiver must be inserted within the pipe 28 to obtain the information from the transmitters 64, 66. A receiver 71, which may be a robot, as is shown in FIG. 6, can be inserted into the main and lateral pipes 78, 80. The receiver 71 includes wheels and a receiving member positioned thereon to emit a signal 72 therefrom to look for transmitters 64, 66 within the pipes 28. When the signal 72 interacts with a transmitter in the pipe, the signal is bounced back to the receiver 71 and can be transmitted via a receiver line or wire 74 to a place outside of the pipe. For example, the receiver wire 74 may be connected to a control station 38, a monitor, or other viewing station such that an operator outside of the pipe can view the physical characteristics within the pipe as was discussed in relation to FIG. 3 above.

The receiver 71 may travel only in the main pipe 78, or it may travel in the direction of the arrow 76 of FIG. 6 to travel along both the main and lateral pipes. The receiver 71 may be remote controlled or otherwise controlled to travel within both main and lateral pipes 78, 80 to determine if the liners include a transmitter. Furthermore, when the receiver 71 finds a transmitter, the RFID tag 20 in the transmitter will allow the operator of the receiver 71 to know information such as address, date of repair, and the like, as was discussed. However, it should be appreciated that that an active transmitter, as was shown and discussed in relation to FIGS. 1-3, may be used with the pipe repair and liner assembly of FIGS. 4-6. The transmitters are interchangeable and the use of passive versus active transmitters may be dependent upon factors such as the type of pipe being repaired, characteristics around the pipe to be repaired, type of transmitter available, type of receiver available, and the like. There is no one reason for using one transmitter or the other.

While certain identification properties as well as certain and specific physical characteristics have been discussed in relation to the RFID tags and sensors, it should be appreciate that the present invention includes generally any physical characteristic and identification property that may be useful for the repair of pipes. The invention is not to be limited to those specifically mentioned.

It should be understood that various changes and modifications to the embodiments described here would be apparent to those skilled in the art. Such changes and modifications may be made without departing from the spirit and scope of the present invention and without diminishing its intended advantages. It is, therefore, intended that such changes and modifications be covered by the appended claims.

What is claimed is:

1. A method of identifying a repaired pipe that has been repaired with a liner including a transmitter capable of transmitting both an identification and at least one physical characteristic, the method comprising:
   receiving the identification and physical characteristic transmitted by the transmitter as the material cures and hardens;
   wherein the identification transmitted by the transmitter comprises the date and time of repair of the pipe, the address of the location of the pipe, or name of repair personnel, or materials used to repair the pipe.

2. The method of claim 1, wherein the step of receiving the identification and physical characteristic occurs remotely from the pipe.

3. The method of claim 1, further comprising viewing the received identification and physical characteristic on a screen remote from the pipe.

4. The method of claim 1, further comprising inserting a receiver into the pipe adjacent the transmitter before receiving the identification and physical characteristic.

5. The method of claim 1, further comprising storing the received information in a database.

6. The method of claim 1, wherein the liner includes a plurality of transmitters each transmitting both an identification and at least one physical characteristic, and wherein the receiving step comprises receiving information from each of the plurality of transmitters.

7. A method of repairing a pipe system comprising a main pipe and a lateral pipe extending therefrom, comprising:
   providing a liner assembly impregnated with a material capable of curing and hardening, the liner assembly comprising a main liner member and a lateral liner extending therefrom and including a transmitter capable of transmitting both an identification and at least one physical characteristic in one of the main or lateral liners;
   positioning the liner assembly within the main and lateral pipes;
   pressing the liner assembly against the pipes; and
   receiving the identification and physical characteristic transmitted by the transmitter as the material cures and hardens;
   wherein the identification transmitted by the transmitter comprises the date and time of repair of the pipes, the address of the location of the pipes, or name of repair personnel, or materials used to repair the pipes.

8. The method of claim 7, further comprising positioning a bladder assembly within the liner assembly and comprising a main bladder tube and a lateral bladder tube extending from the main bladder tube.

9. The method of claim 8, wherein pressing the liner against the pipe comprises expanding the bladder assembly within the liner assembly.

10. The method of claim 7, further comprising adjusting conditions within the liner assembly based on the received identification and physical characteristic from the transmitter.

11. The method of claim 7, wherein the physical characteristic comprises temperature, pressure, flow, location, or velocity of the liner.

12. The method of claim 7, wherein the step of receiving the identification and physical characteristic occurs remotely from the pipe.

13. The method of claim 7, further comprising viewing the received identification and physical characteristic on a screen remote from the pipe.

14. The method of claim 7, wherein the liner assembly includes a transmitter in both the main liner and the lateral liner.

15. A liner assembly for repairing a pipe, comprising:
   a main liner member;
   a lateral liner tube extending from a main liner member opening; and
   a transmitter connected to both the main and lateral liners and capable of transmitting both an identification and at least one physical characteristic;
   wherein the identification transmitted by the transmitter comprises the date and time of repair of the pipe, the address of the location of the pipe, or name of repair personnel, or materials used to repair the pipe.

16. The liner assembly of claim 15, wherein the transmitter comprises a radio-frequency identification transponder and at least one sensor.

17. The liner assembly of claim 16, wherein the sensor comprises a temperature sensor, a pressure sensor, a strain gauge, a flow meter, or a chemical sensor.

18. The liner assembly of claim 15, wherein the transmitter is positioned between first and second layers of the main or lateral liner.

19. The liner assembly of claim 18, wherein the first layer comprises a felt material and the second layer comprises an impermeable coating.

* * * * *